(12) United States Patent
Kanter et al.

(10) Patent No.: US 8,315,387 B2
(45) Date of Patent: Nov. 20, 2012

(54) SYSTEM AND METHOD FOR DATA TRANSMISSION OVER ARBITRARY MEDIA USING PHYSICAL ENCRYPTION

(75) Inventors: Gregory S. Kanter, Chicago, IL (US); Daniel Reily, Chicago, IL (US)

(73) Assignee: NuCrypt LLC, Evanston, IL (US)

( * ) Notice: Subject to any disclaimer, the term of this patent is extended or adjusted under 35 U.S.C. 154(b) by 833 days.

(21) Appl. No.: 12/482,267

(22) Filed: Jun. 10, 2009

(65) Prior Publication Data

US 2010/0098252 A1    Apr. 22, 2010

Related U.S. Application Data

(63) Continuation-in-part of application No. 11/404,329, filed on Apr. 13, 2006, now Pat. No. 7,697,687, and a continuation-in-part of application No. 10/982,196, filed on Nov. 5, 2004, now abandoned, and a continuation-in-part of application No. 12/372,213, filed on Feb. 17, 2009, now Pat. No. 8,265,280.

(60) Provisional application No. 61/060,360, filed on Jun. 10, 2008.

(51) Int. Cl.
*H04K 1/00*    (2006.01)
(52) U.S. Cl. ...................................................... 380/256
(58) Field of Classification Search ....................... None
See application file for complete search history.

(56) References Cited

U.S. PATENT DOCUMENTS 7,333,611 B1 *    2/2008    Yuen et al. .................... 380/256

* cited by examiner

*Primary Examiner* — Brandon Hoffman
(74) *Attorney, Agent, or Firm* — Nadya Reingand

(57) ABSTRACT

Apparatus and method for a secure communication network using AlphaEta quantum encryption is provided. A polarization insensitive optical receiver based on a 90 degrees hybrid coupler is used for the detection and digitization of optically encrypted signals. Once digitized, such signals can be decrypted, stored, or re-transmitted over arbitrary media such as using RF wireless means. Alternatively, the signal can be generated directly for transmission over RF wireless nodes. The system may include nodes for retransmitting the signal without decrypting it, allowing for secure communication among specific users.

34 Claims, 10 Drawing Sheets

SYSTEM AND METHOD FOR DATA TRANSMISSION OVER ARBITRARY MEDIA USING PHYSICAL ENCRYPTION

CROSS-REFERENCE TO RELATED APPLICATIONS

The present invention claims the benefit of U.S. Ser. No. 61/060,360 filed Jun. 10 2008 and is also a continuation-in-part of U.S. Ser. No. 11/404,329 filed Apr. 13 2006 now U.S. Pat. Nos. 7,697,687, 10/982,196 filed Nov. 05 2004 now abandoned and No. 12/372,213 filed Feb. 17 2009 now U. S. Pat. No. 8,265,280, all of which are fully incorporated herein by reference.

The United States Government has certain rights to this invention pursuant to contract No. FA8650-07-C-4516 from the U.S. Air Force Research Laboratory.

FIELD OF THE INVENTION

The present invention relates to secure communication systems and methods that implement cryptography, and more particularly to the use of AlphaEta style physical encryption in communication networks. Aspects of the invention are applicable to optical communications in general including the use of differential in-phase and quadrature-phase detection in advanced modulation format optical systems.

BACKGROUND

Since efficient encryption algorithms, such as the Advanced Encryption Standard (AES), can not be proven to be secure it is always desirable to bolster security further. One method of encryption called AlphaEta was disclosed in U.S. patent applications Ser. Nos. 10/674,241, 10/982,196, and 11/404,329 by the same team of inventors as the present invention; all of those applications are fully incorporated herein by reference. The method performs physical-layer encryption using a combination of traditional algorithms and random noise. Being a method of physical encryption, the transmitted signal modulation is controlled by the AlphaEta protocol. This is unlike typical encryption methods which usually manipulate the parity of binary data according to an encryption algorithm (see, for example, Practical Cryptography by N. Ferguson and B. Schneier, Wiley Publishing, 2003).

The basic implementation of AlphaEta is described in U.S. patent application Ser. No. 10/674,241; and a method to synchronize the encryption/decryption signals is described in U.S. patent application Ser. No. 11/404,329. In AlphaEta, a short secret key is shared between the transmitter (Alice) and the receiver (Bob). This key seeds an extended key generator (EKG), which extends it into a very long sequence of bits, called the extended key. For every data symbol to be transmitted, where the number of data bits in each symbol is N, several extended key bits are grouped and used as a running key to extend the N-bit symbol to a larger M-bit symbol, where M>N. The M-bit symbol is implicitly or explicitly corrupted by a small amount of noise such that the $2^M$ possible symbols can not be uniquely determined. The signal is transmitted to a receiver, which uses a matched EKG to translate the M-bit symbol back into an N-bit symbol which then allows for the reception of the N-bit data with a low bit error ratio.

Typically AlphaEta is implemented directly on an optical signal so as to take advantage of quantum noise as the random noise source (random noise is exploited for security purposes in AlphaEta). Such a method is useful for optical point-to-point links or in all-optically switched networks. The use of AlphaEta in Wavelength Division Multiplexed (WDM) optical systems is described in U.S. patent application Ser. No. 10/982,196 by the same team of inventors. Although such systems are important, they represent only a fraction of communication systems currently employed. In particular, electronically switched networks which can function over optical, wireline, and RF wireless media are of significance. It is desirable for nodes in secure packetized networks to be able to inspect some packet information in order to determine if and how to decrypt the signal, such as disclosed by Kirby, et al. in U.S. Pat. No. 5,898,784. If the packet is to be re-forwarded, there is a need that the node determines to which (switched) port to send the packet and, for security reasons, to do so without fully decrypting the data. Such advanced functionality has not been addressed in prior art implementations.

In the course of specifying a preferred implementation of the aforementioned functionality, an approach to receiving differential phase-shift keyed signals of arbitrary density is described. Such a receiver is useful specifically for the type of optical signals generated by the AlphaEta encryption protocol, but is generally applicable for any optical communication system based on advanced modulation formats such as differential quadrature phase shift keying (DQPSK), especially in a wavelength division multiplexed (WDM) environment. In particular, a method of using just one optical interferometer to measure multiple signals without requiring frequency locking is disclosed.

SUMMARY

Physical-layer encryption based on randomized encryption is disclosed to be used in highly secure communication networks. One of such encryption protocols is AlphaEta, which was previously described in U.S. patent application Ser. No. 10/982,196 filed Nov. 5, 2004 by the same team of inventors. AlphaEta is a physical layer encryption method that increases the density of the transmit modulation format based on the output of a cryptographic algorithm. One of the aspects that enhances the security of AlphaEta is that random noise is part of any eavesdropper's observation of the transmitted signal which impairs her ability to analyze the signal. At the receiver the density of the modulation format can be reduced since the receiver has an extended key generator with the same cryptographic algorithm as the transmitter, allowing the receiver to making it look like a typical communications signal. After converting the modulation format back to a lower density, the receiver is less sensitive to noise and can receive the secret message without error.

In the preferred embodiment the data transmission system comprises an optical transmitter transmitting the quantum encrypted signal; the signal is phase modulated according to an M-ary phase modulated format where the phase applied is determined by both a pseudo-random cryptographic algorithm working as a first extended key generator and the data to be transmitted, and a number of data bits transmitted per symbol is N, wherein N<M. The system also includes a receiver which measures an incoming signal by making measurements at two or more different phase quadratures, called the in-phase (I) and quadrature phase (Q), digitizes the measurement using analog-to-digital converters, and estimates the phase applied at the transmitter using a digital signal processor (DSP). At this point the signal can be decrypted, retransmitted, or stored.

A polarization insensitive operation of the optical receiver is achieved by using a demodulator consisting of a 90-degree optical hybrid in combination with two Faraday mirrors and a delay line to add a delay in one of the quadrature components. The use of a delay line in an I/Q demodulator constitutes an asymmetric I/Q demodulator.

In one embodiment the quantum encrypted signal is a pulsed signal, and a portion of the incoming signal is separately detected to recover a clock. The clock is generated by feeding the incoming signal whose frequency is at the symbol rate into a linear feedback shift register to generate a non-return-to-zero signal which is subsequently transformed into a clock by a clock-and-data recovery circuit.

In order to increase the applicability of AlphaEta encryption, we disclose an electronically switchable network over various media including, for instance, optical fiber, radio frequency (RF) wireless, and RF cable, as well as over networks employing multiple types of media. Electronically processing (such as storage or switching) of AlphaEta signals is also a crucial function which is needed to expand operation into realistic mixed-medium electronically switched networks. The switching is performed using a signal regenerator after the DSP; the regenerator regenerating the encrypted signal and a re-transmitter retransmitting a regenerated encrypted signal. The re-transmission may be in RF range.

In case of a variable transmitted symbol rate the receiver uses an asymmetric I/Q demodulator with a tunable delay line in order to recover the I/Q information from the signals with different symbol rate.

When the transmitter and the receiver are moving with respect to each other; a corresponding Doppler shift introduces a fast equivalent wavelength shift of the quantum encrypted signal; and the effect of the wavelength shift on the determination of the differential phase is accounted for via the digital signal processing.

In one embodiment, the system transmits data over multiple channels with different wavelengths. A wavelength demultiplexer is located on the I and Q outputs of a single I/Q demodulator, where the demuliplexer splits the incoming signals of different wavelength allowing for each channel to be received separately. If the channels have different symbol rates, then different asymmetric I/Q demodulators are used to recover the information. A delay line of the modulator corresponds to the symbol rate of the recovering signal.

The nodes in packetized (or other) networks are able to inspect some packet information in order to determine if and how to decrypt the signal or if the packet is to be re-forwarded without decryption and to which switched nodes. In one embodiment the encrypted signal has an unencrypted header or a header traditionally encrypted with information allowing the intermediary node to determine a source and a destination of a signal packet. The frame header may be modified by the node according to an underlying protocol without disturbing an AlphaEta encrypted portion of the packet.

In one embodiment the first node switches AlphaEta frames by converting an M-ary potion of the packet to a longer binary packet which is subsequently switched into a traditional network being compatible with binary frames but not with M-ary AlphaEta frames, a resulting binary packet is transferred through the traditional network until it reaches a second node being compatible with M-ary AlphaEta signaling, the second node re-converts the encrypted signal back to the M-ary AlphaEta format for sending through an AlphaEta-capable network. In yet another embodiment, the transmission or re-transmission of a packet is of a protocol that requires an acknowledgement frame and wherein the following node can send an acknowledgement frame back based on its own frame processing as well based on acknowledgement frames received from other nodes which process the frame.

In another embodiment the encrypted data frames use an AlphaEta protocol over a network that is capable of sending the frames through the node using a key hierarchy where two or more keys are used to encrypt the data, one being an AlphaEta key, which can transform symbols from binary to M'ary format, another being a standard encryption key which is only distributed to nodes that are authorized to access a secret data itself, where the node converts the M-ary AlphaEta signal into a binary traditionally encrypted signal for the purpose of processing the frames but then re-encrypts the frames into AlphaEta format upon re-transmission, and wherein the receiver decrypts both the AlphaEta and standard encryption in order to gain access to the secret data.

A method and system for using AlphaEta-style encryption in mixed media electronically switched networks is described herein. Digitization of the multi-level AlphaEta signal, synchronization of the encryption/decryption functions (including packet-level synchronization if needed), and interface issues related to crossing between different media and communication protocols as well as switching signals between various nodes will be addressed. A system of data transmission using AlphaEta-style encryption is implemented in a radio-frequency communications and a local noise source generates noise which is added to an M'ary transmission symbol, where the M'ary symbol is determined both from a pseudo-random cryptographic algorithm and the data to be transmitted, and wherein the M'ary symbol contains N bits of information on the data, and where N<M. The radio-frequency communications uses an orthogonal frequency division modulation format and a plurality of sub-carriers are transformed into an M'ary symbol by an encryption process. A pad is inserted in the packet so that the M'ary signals start at the beginning of an orthogonal frequency division multiplexed symbol. The radio communications may be implemented in a software defined radio.

It is another object of the present invention to provide a method for data transmission of quantum encrypted signals, comprising: sending a quantum encrypted signal; the signal being phase modulated according to an M-ary phase modulated format where the phase applied is determined by both a pseudo-random cryptographic algorithm working as a first extended key generator and the data to be transmitted; a number of data bits transmitted per symbol is $N_1$, wherein $N_1$<M. The method includes receiving the transmitted signal by a receiver having a delay line corresponding to the number of data bits $N_1$, measuring two or more different phase quadratures, digitizing measured signals, and estimating the phase using a digital signal processing, and recovering information from the transmitted data.

AlphaEta encryption may be used in this method. When passing a node, switching an AlphaEta frame is performed by converting the M-ary portion of the packet to a longer binary packet and then switching it using conventional switching technology; and subsequently re-converting it into AlphaEta frames before retransmission.

In this method the quantum encrypted signal may be encrypted using a key hierarchy where two or more keys are used to encrypt the data, one being an AlphaEta key, which can transform symbols from binary to M'ary format, another being a standard encryption key which is only distributed to nodes that are authorized to access a secret data itself, and converts the M-ary AlphaEta signal into a binary traditionally encrypted signal in the nodes; processing the frames; but then re-encrypting the frames into AlphaEta format upon re-transmission, and decrypting both the AlphaEta and standard encryption at the receiver in order to gain access to the secret data.

Yet another object of the present invention is a method of data transmission using an AlphaEta-style encrypted signal in radio-frequency range.

DETAILED DESCRIPTION

Digitization of an Optical AlphaEta Signal for Compatibility with Electronic Processing.

In order to allow for electronic processing, such as switching, buffering, and regeneration, an optical AlphaEta signal should be digitized in the electronic domain. This function is also necessary to interface optical transmissions with other formats such as RF wireless. The combination of the AlphaEta encryption transmission format, optical-to-electronic multi-level digitization, and suitable methods for converting the signal to a different form such as to encapsulated serial-digital for compatibility with standard switching electronics or to a RF wireless-compatible format will allow much more complex and more secure AlphaEta encrypted networks to be built without requiring intermediary nodes to be able to fully decrypt the signal, which is desirable from a security standpoint. The optical-to-electrical digitization function could be performed by a number of means, such as quadrature-phased homodyne detection followed by analog-to-digital (ADC) converters.

There is a trend in the community to utilize differential phase-shift keying (DPSK) methods in lieu of purely coherent methods, as the differential format is less susceptible to various practical issues such as laser linewidth. Thus, we choose to describe one preferred embodiment which utilizes this format. However, this is just one potential implementation.

The AlphaEta D-MPSK signal can be generated with an optical phase modulator as described in U.S. patent application Ser. No. 10/982,196 by the same team of inventors; this application is incorporated into this document by reference. The signal is defined differentially, so a receiver must determine the relative phase shift between two successive time samples of the received signal. In binary DPSK, this is often done by biasing an asymmetric Mach-Zehnder interferometer (AMZI) such that the interfering symbols (which generally carry either zero or π phase shift) interfere either constructively or destructively on each output. Such a method works in the binary case, but in the M-ary case a receiver ideally measures two separate quadratures, typically labeled I and Q, which differ in relative phase by 90 degrees (other relative phase differences such as 120 degrees can be used too but are less efficient).

Figure 1:
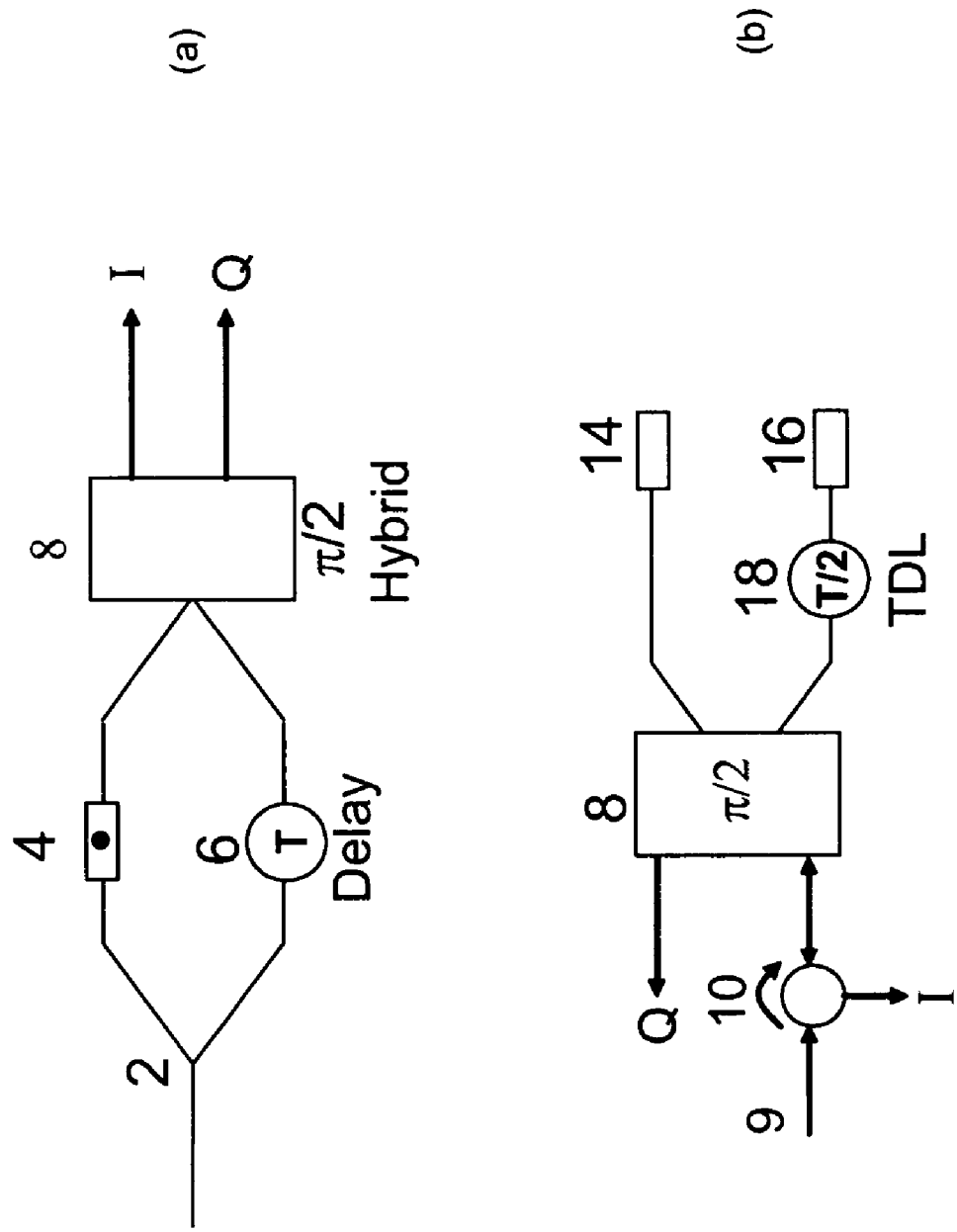
FIGS. 1 (a) and (b) illustrates two architectures for interferometers using 90 degree hybrids which can be used as differential demodulators. T is a time equal to one bit period. The version on top (a) may require polarization balancing via a fiber polarization controller (FPC), if the interferometer is constructed with standard fiber pigtailed components. The improved version on the bottom (b) is polarization insensitive even if long fiber pigtails are used but requires additional components including a circulator 10 and faraday rotators 14, 16.

An optical hybrid such as described in U.S. Pat. No. 5,027, 436, by Delavaux et al. could be used to create the I and Q measurements, as shown in FIG. 1. Here a (typically 50/50) splitter 2 (FIG. 1a) splits the optical signal into two arms one of which passes through a polarization controller 4 and the other through a delay line of one bit 6. The signals in both arms are combined in an optical hybrid 8 to form the I and Q outputs. FIG. 1(b) shows how an optical hybrid could be combined with standard optical fiber and Faraday rotators to create a polarization insensitive version of the I-Q demodulator, where now the input signal 9 passes through an optical circulator 10 into the hybrid 8 to create the two interferometer arms. One arm is reflected by a Faraday mirror 14 while the other propagates through a delay line 18 before being reflected by a separate Faraday mirror 16. The delay line delays one arm by half a bit period since the signal propagates through the arm twice. Upon returning to the hybrid 8 the arms are combined to form the I and Q signals. Such a demodulator is now allowing for full phase information to be determined. However, as will be described later, the I/Q implementation is more practical since the relative optical phase between the two arms does not have to be stabilized as would normally be the case in a typical interferometer (the phase can be tracked in the digital domain). This allows, for instance, the use of convenient components which may have long fiber pigtails and the use of a tunable delay line to tune the symbol rate as desired. Such components could be used in the standard demodulator such as described in "Practical cryptography" by N. Ferguson et al, 2003, but the need for interferometric stability make it far more difficult to use. Another method of demodulation would be to use an integrated optical circuit to separate the I and Q components, see star coupler demodulator in "Monolithic Demodulator for 40-Gb/s DQPSK Using a Star Coupler," by Doerr et al. in Journal of Lightwave technology, v.24, No. 1, 2006. This has the benefit of small size but is generally not rate tunable. Any method that preserves the full differential phase information could be used.

Figure 2:
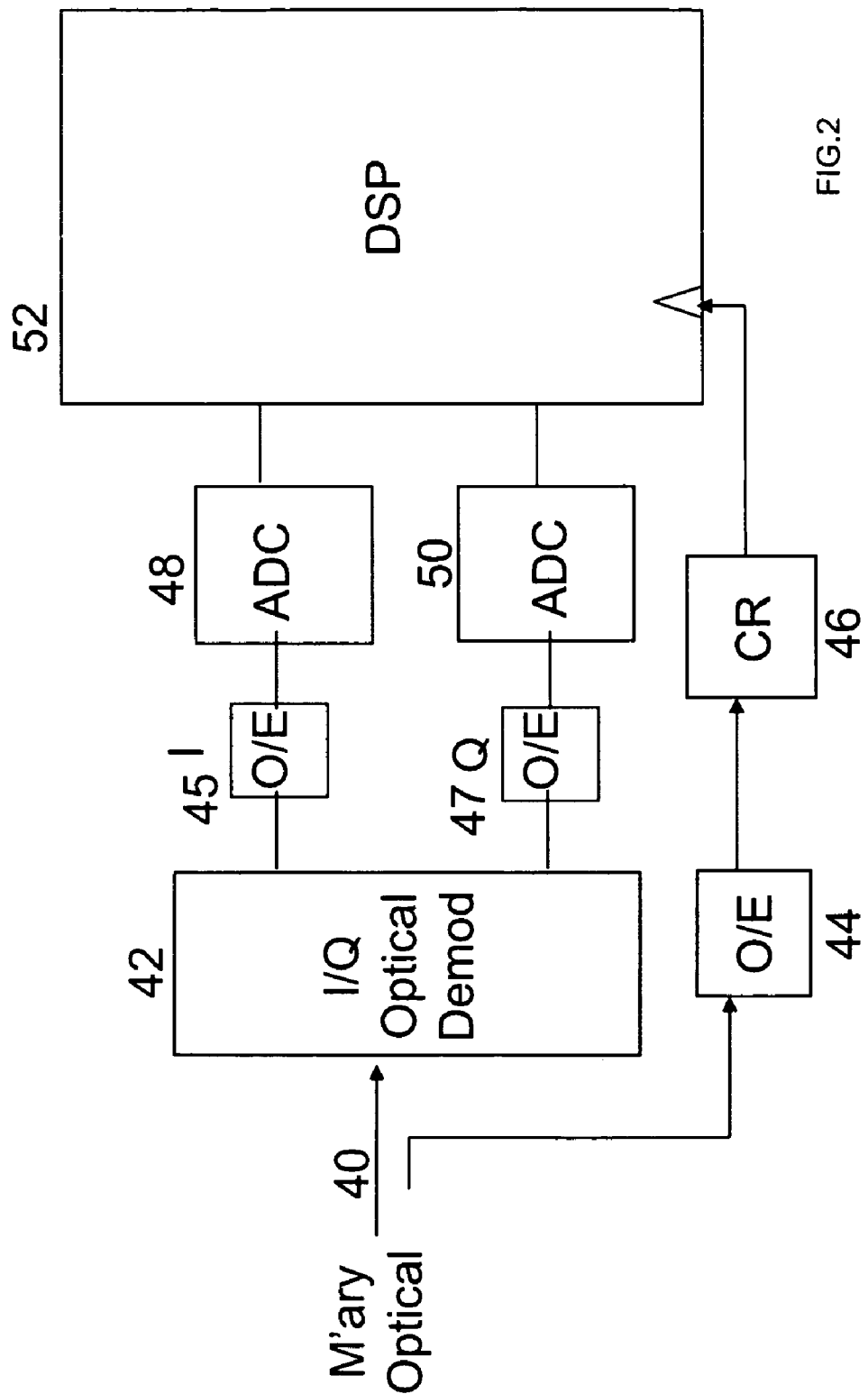
FIG. 2 illustrates the I-Q demodulator functioning together with electronic digital signal processing (DSP). The I-Q signals are sampled using an analog-to-digital converter (ADC), and sent to the DSP. The signal is assumed to be pulsed so an optical tap 40 followed by an opto/electric converter and clock recovery circuit (CR) recovers the clock. A look up table in the DSP can be used to convert the two I-Q measurements into a differential phase measurement (similar to an Arc-Tangent function).

FIG. 2 shows how the I/Q demodulator can be used as part of an electronic digitizer of complex optical modulation formats using differential phase shift keying. The I and Q signals out of the I/Q demodulator 42 are detected by opto-electronic (O/E) detectors 45,47 and sampled with analog-to-digital converter (ADCs) 48,50 prior to being sent to the digital signal processing unit (DSP) 52. By sampling the multi-level signal prior to electronic processing, we can simplify the optical hardware used in multi-level receivers. This is true for both AlphaEta-based and traditional multi-level communication systems. AlphaEta signals require additional processing over traditional signals and, as will be described, generally can be sampled with an ADC resolution less than the density of the transmission resolution.

Note that I and Q measurements are sometimes used in some traditional optical communication systems such as DQPSK. This invention extends such previous work to include a specific differential I/Q demodulator design which can be built with readily available components without much concern for phase drift between the interferometer arms, to specifically function as part of a network using AlphaEta encryption which allows electronic processing of the data including decryption, storage, and switching, and to apply it to wavelength division multiplexed systems such that only one I/Q demodulator is needed for measuring multiple wavelengths.

Most interferometric-based receivers require strict phase relationships to be maintained at the interferometer. This usually requires some sort of feedback control to compensate for environmental drift and may be difficult to implement on a very-dense M-ary signal such as that typically used in AlphaEta. Note that U.S. patent application Ser. No. 10/982, 196 by the same team of inventors discloses the interferometer that does need to have feedback control in order to stabilize the internal phase, but the signal was decrypted prior to the interferometer so standard techniques could be used to lock the phase. In the current invention decryption does not necessarily occur in the optical domain and thus a different technique is needed. An I-Q demodulator automatically maintains the desired 90 degree phase difference between the output ports. Although the absolute phase of both arms of the interferometer may drift slowly, because data is defined differentially that drift is not particularly important and can easily be processed out.

In the simplest case, assume a binary signal. The first differential phase measurement can be any phase from zero to $2\pi$ depending on the arbitrary differential physical phase between the two arms of the interferometer before the hybrid combiner. The next differential phase measurement will either be within $$\pm \frac{\pi}{2}$$

of that measurement, in which case one would assume the phase did not change, or it will be larger than that in which case the phase did change. Clearly simple averaging or other processing techniques could be used to damp out fluctuations and calculate a more accurate threshold, as has been demonstrated with other detection methods, see, for example, "Coherent Detection of Optical Quadrature Phase-Shift Keying Signals With Carrier Phase Estimation" by Ly-Gagnon et al. in Journal of Lightwave Technology v.24, No. 1, 2006. The threshold would drift over time, but would be trackable completely in the electronic domain. We will use this property to design robust and cost effective systems.

After the I-Q components are separated they are sampled by analog-to-digital converters (ADCs) and sent to processing electronics which can determine the differential phase shift. One such configuration is shown in FIG. 2. The digital signal processing (DSP) block can be implemented in any convenient way such as in a a field-programmable gate array (FPGA). An FPGA could use a two-dimensional look-up table to approximate the Arc-Tangent function and determine the phase from the I and Q measurements. Note that for simplicity the figures show only the I and Q outputs of the I/Q demodulator being used, however often there are additional outputs of the I/Q demodulator such as I+180 degrees and Q+180 degrees. Of course these outputs could be used to improve the measurement in the customary ways. The relative phase between different bits can be recorded to the appropriate resolution, which is specified by design but may be a system variable. Typically the encrypted signal has 6 to 11 bits of additional resolution beyond the base modulation format (the base modulation format is the number of data bits per symbol, not the density of the signal constellation). Such a high resolution at the transmitter is used to force quantum noise to obscure the signal set, as is customary in AlphaEta signaling. However, all these bits of resolution can not be distinguished at the receiver due to noise. Thus the receiver may typically use just 3-6 more bits of resolution than the underlying data modulation format (for instance, for a binary underlying data format about 4-7 bits of resolution may be adequate). Less resolution requires less processing and would likely use less costly and lower power consumptive parts, but more may maintain better performance particularly if the signal is digitized multiple times or travels over a noisy link. The use of a lower-resolution ADC to capture AlphaEta signal constellation created with a higher-resolution at the transmitter is a design tool which can reduce cost and power consumption in the system.

An RZ-pulsed format can be used which may ease issues associated with clock recovery. One such a method is depicted as the clock recovery method of FIG. 2, where an optical tap 40 feeds the optical pulse train to an optical-to-electrical converter 44 which sends the electrical symbol-rate to a clock-recovery circuit 46 which could be a phase-locked loop or a filter and nonlinear amplifier. Another method of clock recovery would be to drive a simple digital circuit, such as a linear feedback shift register (LFSR) with the electrical symbol-rate clock. The LFSR could then feed a standard non-return-to-zero clock recovery circuit. The advantage here being that standard clock-recovery circuits are already designed to meet various specific jitter specifications, so using pre-approved standard circuitry may ease system design. Other clock-recovery methods are possible, even with a non-return to zero format, such as using over-sampling in the ADC.

Once the M-ary optical signal has been captured electronically, several different functions could be applied to it. For instance it could be directly re-transmitted without any additional processing which can be viewed as a regeneration function. In order to regenerate, the digitized signal needs to be re-transmitted to an optical phase modulator, usually via a digital-to-analog converter (DAC). Similar to regeneration of binary optical signals, regeneration can allow the AlphaEta (or other phase-shift keyed format) signal to propagate longer distances or through noisier environments. Alternatively, the signal could be stored on any number of storage media, such as FLASH RAM, digital video disk, or a magnetic hard drive, for later transmission or decryption. Another important function could be decryption of the AlphaEta signal. In previous DPSK AlphaEta implementations (U.S. patent application Ser. No. 10/982,196 by the same entity) the encrypted signal was decrypted by applying the decryption phase shift in the optical domain via a phase modulator. However, if an I/Q demodulator is used the full phase information is available in the digital domain. The signal processor can thus subtract off the phase shift digitally instead, thereby eliminating the requirement of the receive-side phase modulators. This also likely reduces the latency between the generation and application of the AlphaEta phase shifts, which is particularly important for packetized networks where any arbitrary packet may require the use of a different secret key.

Figure 3:
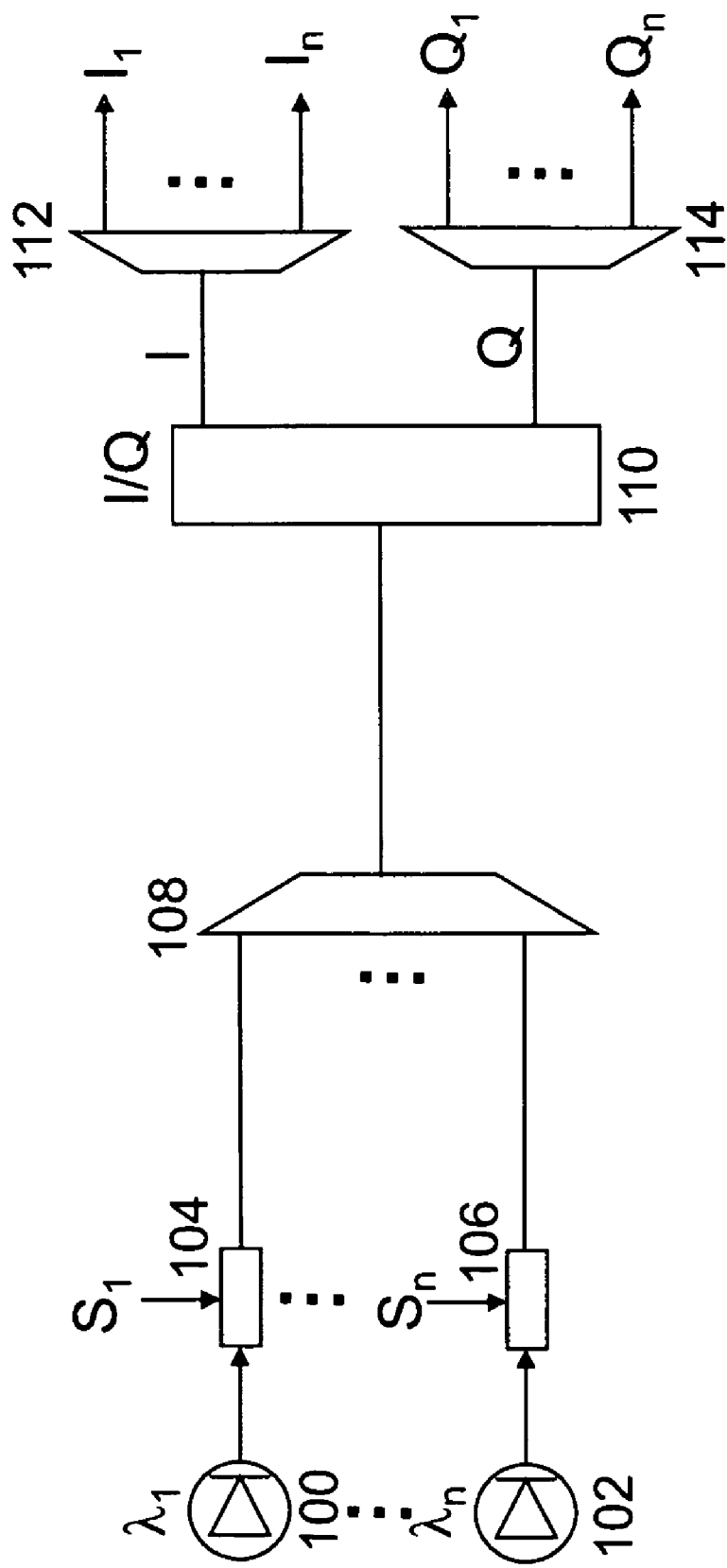
FIG. 3 shows how the I/Q demodulator can be used in a WDM network such that only one I/Q interferometer is needed (assuming all wavelength operate at the same symbol rate). Multiple signals ($S_1$ to $S_n$) are wavelength multiplexed and demultiplexed after the I/Q demodulation. The internal I/Q phase bias for each wavelength can be determined afterwards via DSP.

We note that there are several advantages inherent in using the I/Q measurement device that can be taken advantage of in system design, including standard (unencrypted) communication systems. One key advantage is that the inherent phase difference between the two interferometer arms can be processed out. This feature can be used to improve the system design. For instance, FIG. 3 shows how a wavelength division multiplexed (WDM) design can be implemented that uses just one I/Q demodulator 110 instead of a separate demodulator for each wavelength. Each wavelength generated by the transmit lasers 100,102 are separable via optical filters but do not need any special phase relationship (frequency locking) The phase modulators 104,106 can send any differential phase-shift keyed format, including binary DPSK, quaternary DPSK, or D-MPSK as in AlphaEta. The various wavelengths are combined in a wavelength division multiplexer 108 (WDM) as is now common place in optical communications, and passed through the I/Q demodulator before subsequent wavelength demultiplexing in the WDM demultiplexers 112, 114. Each wavelength will have an I and Q output. Since the lasers 100,102 are independent and not locked in any special way, the inherent phase drift in the I/Q interferometer may be different for each wavelength. This is not a problem for the system since each wavelength preserves the full phase information and the differential phase information is maintained in the presence of interferometer drift. Note that even if all the signals are simple binary differential phase-shift keyed (not encrypted), using just one standard demodulator such as an asymmetric Mach-Zehnder interferometer (AMZI) in a similar way restricts the various wavelengths to be precisely locked to one another, see, for example, "High sensitivity multi-channel single-interferometer DPSK receiver" by D. Caplan et al. in Optics Express, v.14, No. 23, 2006. In the I/Q case, the absence of a need for phase/frequency locking of the various channels simplifies, increases the flexibility, and reduces the cost of such a system. The various wavelengths in FIG. 3 only need to work at the same symbol rate (but possibly different data rates) and can have different modulation formats including AlphaEta. Note that if the I/Q demodulator has a tunable delay line in one arm, the symbol rate for the wavelength channels can all be changed simultaneously. Alternatively multiple I/Q demodulators can be used to allow different symbol rates for some channel groupings.

Another example of the utility of being able to compensate for the phase drift with signal processing would be a free-space DPSK communication link where the nodes are accelerating with respect to each other thereby leading to a Doppler phase shift. Such a shift would cause trouble for a standard AMZI that would need its internal phase to track the Doppler phase shift. If the internal phase is set via a slow mechanism such as thermal tuning, such control may even be impossible. However, it can be easily accounted for using digital signal processing if an I/Q demodulator is used.

Synchronization and Switching in a Network Environment

In a network a node receiving a signal may be the final destination of the data or it may be an intermediary node. In packet-switched networks or mesh networks, there may be many intermediary nodes between the transmitter and intended receiver. We describe a method to allow a node in a network with an AlphaEta encryption function to determine its required operation such as decryption or switching. Intermediary nodes can process the signals, such as forwarding them to the appropriate ports, without having to decrypt the data. Applying a method where intermediary nodes do decrypt the data (see, for example, U.S. Pat. No. 5,479,514 by Klonowski et al.) would be more straightforward given AlphaEta links have already been demonstrated and standard processing could be used on the locally decrypted signal, and such a method is incorporated into this document as a simplified case. However, local decryption would pose certain security and practical barriers. For instance, users need to have confidence the intermediate node, which may not be under the control of the transmitter or receiver, is physically secure and that they protect their key material properly. Without loss of generality we will describe a packet-switched network, although straight-forward modifications would allow other network configurations such as circuit-switched to be implemented as well. Note that we previously proposed a synchronization scheme where a header indicated the start-of-decryption time but did not specify intermediary nodes and thus is not a typical network environment (except in an all-optically switched network).

Figure 4:
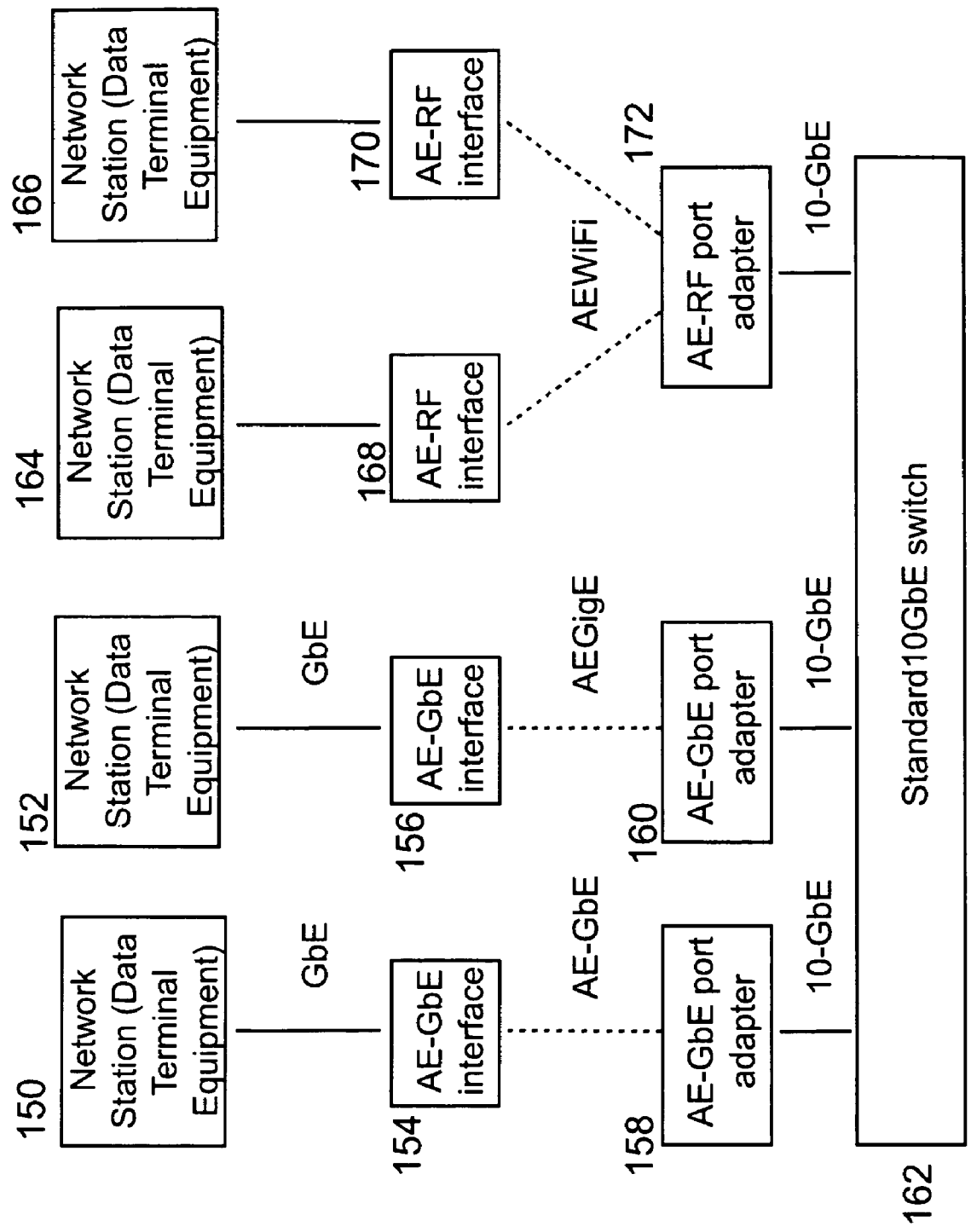
FIG. 4 illustrates a mixed media AlphaEta encrypted network. Solid lines connecting blocks are binary (or M-ary with low M) while dotted lines are M-ary (with high M). The AE-GbE interface connects a GbE Data Terminal Equipment (such as a computer) to the encrypted network, allowing for packet-level encryption or decryption as needed. The AE-GbE port adapter either receives the (M-ary) encrypted signal and encapsulates it into a standard 10GbE packet, or accepts a 10GbE packet encrypted by a different AE-GbE port adapter and converts it back into an (M-ary) AlphaEta signal. The AE-RF port adapter interfaces the wireless signals to the switch in a similar way.

One preferred embodiment of the system would be a network based on the Gigabit Ethernet (GbE) protocol, although this is clearly just one among a very large number of potential underlying protocols and is chosen merely as an example case. We will describe the system in the block diagram of FIG. 4. Initially, we will simplify the figure where we assume the underlying communication format, in this case assumed to be GbE, is the same for all communication nodes. This is the case if only nodes 150 and 152 of FIG. 4 are active. Altering the system design to make multi-format communications easier will be addressed later.

Figure 5:
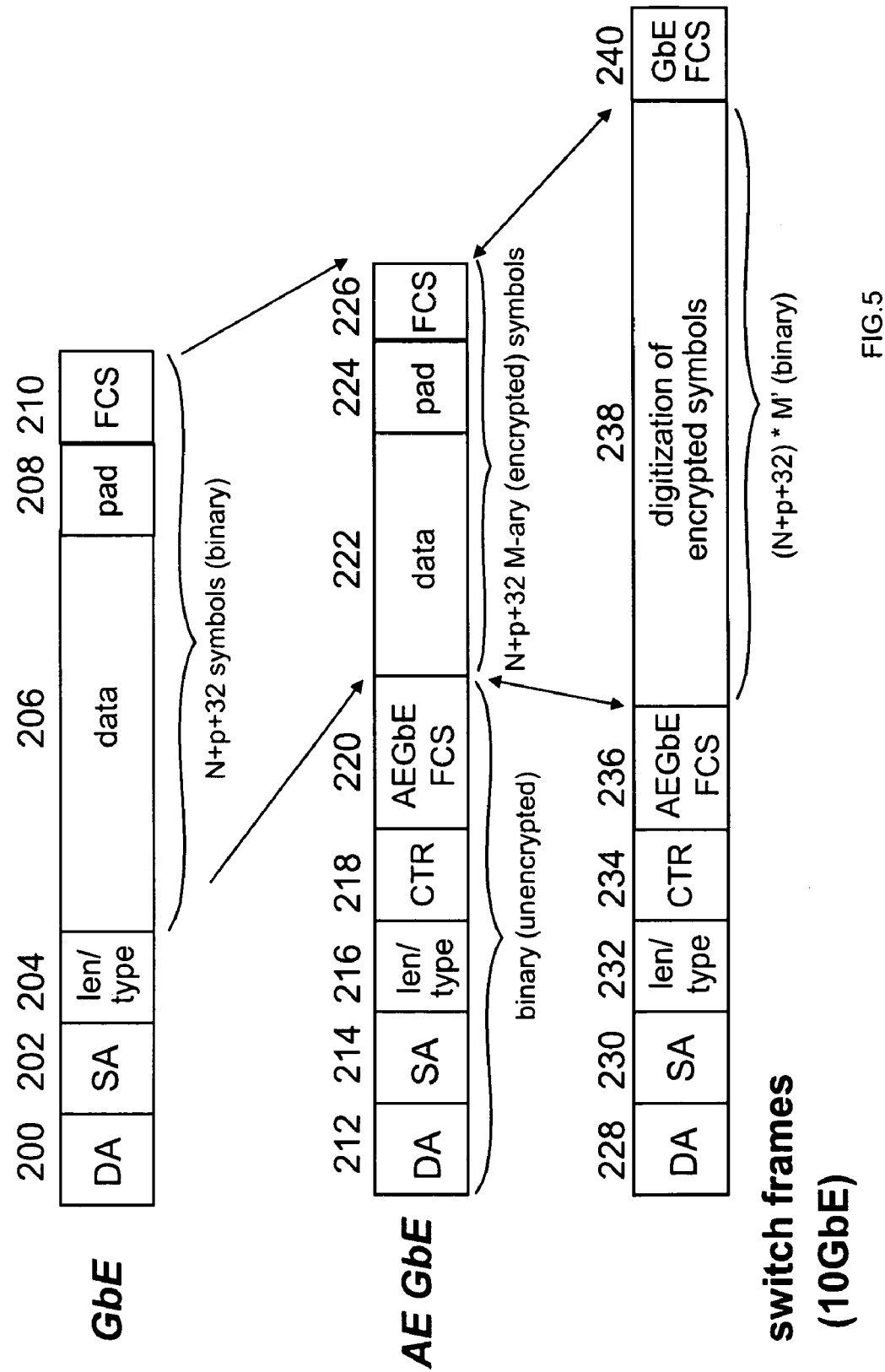
FIG. 5 shows a typical packet structure of a standard GbE frame, an AE-GbE frame, and the switch frame generated by the AE-GbE port adapter for propagating through the switch. Portion of the packet are not encrypted with AlphaEta so that information such as the destination address (DA) is available. Extra information such as the cipher counter (CTR) is also added. Since the switch frames convert M-ary signals to binary they are expanded in length, in this case the encrypted portion of the frame is expanded from N+p+32 M'-ary symbols to (N+p+32)*M' binary symbols. Here N is the number of data bits, p is the number of bits in the pad, and 32 is the typical number of bits in the FCS.

The GbE nodes 150 and 152 generate standard GbE packetized data which is sent to the AlphaEta GbE interface (AE-GbE) 154,156. AE-GbE modulates the transmitted packets such that the data portion of the GbE frame is encrypted in the AlphaEta format, although the header is unencrypted (or encrypted with a standard encryption protocol). Examples of which portions of the packets may be encrypted are shown in FIG. 5. In this case the destination address 200 (DA), source address 202 (SA), and length/type address 204 are left unchanged, and additional binary bits containing the counter 218 and the optional AlphaEta GbE frame check sequence 220 (FCS) are added. The AEGbE-FCS may, for instance, add a standard frame check sequence over just the unencrypted portion of the packet. The original data 206, pad 208, and FCS are converted from binary into encrypted M-ary symbols based upon the extended key output of the AlphaEta system. We are assuming here that the output of the AE-GbE is an M-ary phase-shift keyed format. The AE-GbE can also receive AlphaEta M-ary signals from the network and can decrypt the encrypted signals and strip off the added header bits thereby converting the frame to a standard GbE for interfacing to common equipment such as a computer terminal. The AE-GbE is similar to previous AlphaEta transmit and receive equipment that has been demonstrated previously in that it can encrypt and decrypt data, as well as choose to send some portions of the signal in unencrypted format for synchronization purposes. However, additional intelligence is added to start and stop encryption using the correct keys at the appropriate places inside the packet and to modify the packet the send additional data such as the counter value in the clear (unencrypted) as previously described. The correct key is determined by observing the unencrypted (or encrypted with a traditional encryption scheme) source and destination addresses (or other header information), and referring to a memory which links that information to the appropriate key.

Figure 6:
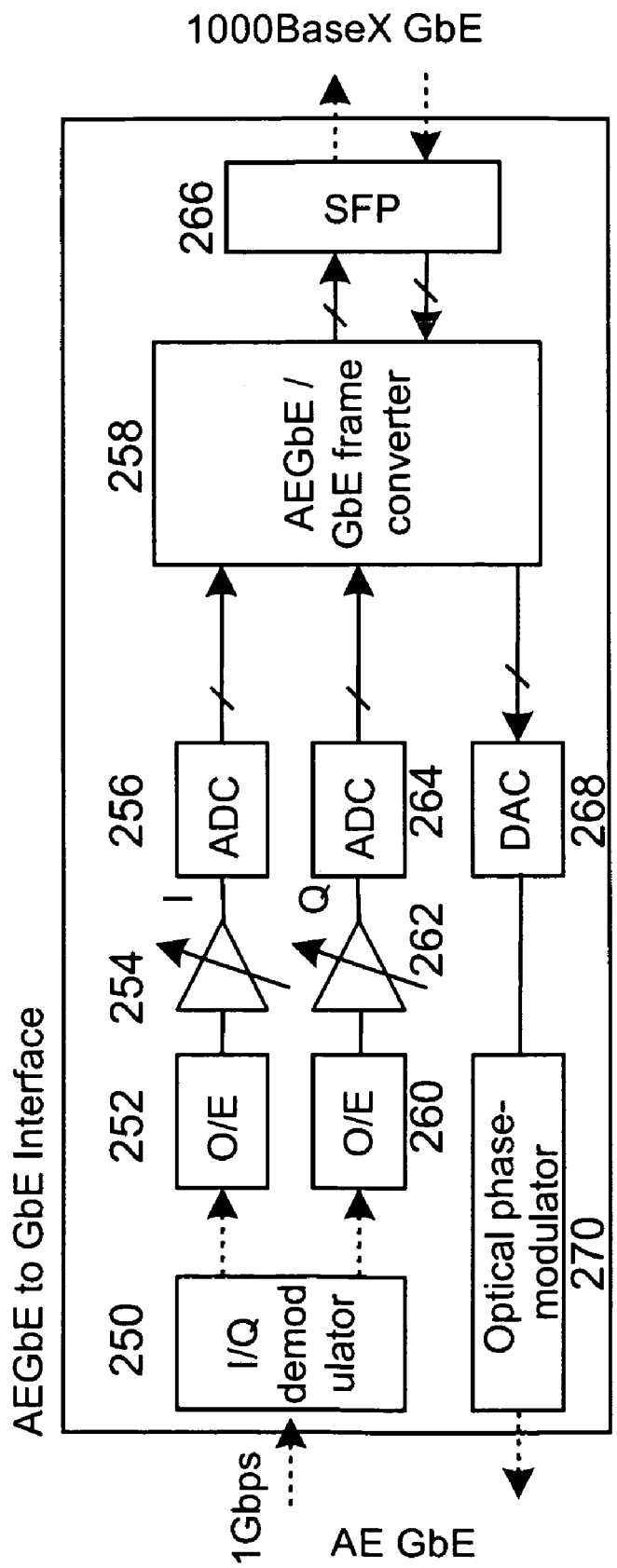
FIG. 6 shows a block diagram implementation of the AE-GbE interface. It is assumed here that a standard small form factor pluggable (SFP) transceiver is used to interface to the optical GbE side, but this could be any other convenient interface.

The decryption process can either use optical phase modulators, as in previous AlphaEta demonstrations, or use the I-Q demodulator followed by electronic decryption as previously described in this document. The latter case is assumed in FIG. 6 which outlines the AE-GbE sub-functions. The I/Q demodulator 260 creates the I/Q signals with are sampled by the ADCs 256,264 after variable gain amplifiers 254,262 which keep the signal size in the correct range. The information is sent to the AEGbE/GbE frame converter, which can perform the packet header modification and AlphaEta encryption/decryption. The interface to the standard GbE is depicted via a small form factor pluggable 266 (SFP) transceiver, but any physical means of communicating the desired protocol is possible. A digital-to-analog converter 268 (DAC) followed by an optical phase modulator 270 can send the encrypted out-going packets out to the network.

The AE-GbE signal is then propagated over a network link to the AlphaEta GbE port adapters 158,160 (FIG. 4). These port adapters accept the AE-GbE optical signals and electronically digitize them using the previously described I/Q optical-to-electrical sub-system. Additionally, extra circuitry can be included to serialize the bit stream and 'wrap' the multi-bit per symbol quantized signal into a standard 10GbE packet. This function is depicted in the bottom of FIG. 5, where each encrypted M-ary symbol in the AE-GbE packet is expanded to use M' multiple binary symbols. Note that in this case the M' value could be reduced to reflect the effective resolution of the analog-to-digital converter sampling the data and does not have to be the same "M" as is used at the transmitter. By converting the M-ary signaling to digital binary, we allow standard off-the-self 10GbE switching electronics to control the flow of frames inside the network. This allows the leveraging of low-cost high volume electronics already developed for common protocols such as 10GbE. Note that the 10GbE switch is just a standard binary switch which is not able to decrypt the data. Also note that a switch that operates faster than the raw data rate is needed in order to accommodate the added size of the un-wrapped signals. This problem can be mitigated by configuring the system to limit the transmit packet size accordingly. Alternatively the port adapter can determine if the packet size it too large and fragment it into multiple smaller packets as needed with an additional filed in the frame to keep track of the fragmentation.

The AlphaEta GbE port adapter can also perform the inverse operation where it accepts the 10GbE switched packets and converts them back into an AlphaEta GbE signal for re-transmission. Re-transmission would typically send the signal to a phase-modulator. The re-transmission process would send the binary header out in binary format and re-concatenate the encrypted M'-ary signal so that it was re-transmitted in M'-ary format. Note that unlike the AlphaEta transmitter that originates the signal, the AE port adapter does not have to add any noise to the signal, since the noise in the received signal is inherently maintained (or increased) during the reception/switching/retransmission process. The AE port adapters effectively perform a regeneration of the AlphaEta signal.

Note that the signals being processed by the standard switch (in this case 10GbE) could be sent directly over a standard 10GbE network. This capability is useful, as it allows AlphaEta capable endpoints to communicate even if they are not fully connected by a custom AlphaEta network. However, there will be some bandwidth degradation as the encrypted binary signal will need to transmit multiple bits in order to send a single data bit. If the port adapters have effectively 6 bits of resolution, the degradation of bandwidth will be on the order of 6 times. We will later describe a mode of encryption where the frames are partially decrypted such that the encrypted portion of the frames are encrypted using a standard binary encryption format thereby allowing standard switches to be used without encapsulation and without requiring a larger bandwidth for the switch.

RF Wireless Interface/Mixed Format Networks:

An AlphaEta RF interface (AE-RF) can be used to allow wireless nodes 164,166 to be added to the network. RF interfaces typically use different protocols so this could make the network a mixed format and media network. The AE-RF AlphaEta wireless interface blocks 168,170 accept data from the local source in a standard format (say Ethernet) and converts it to an AlphaEta wireless format. The AlphaEta wireless signaling format, like all AlphaEta encryption schemes, requires the use of a pseudo-random number generators (for instance the AES algorithm in counter mode) plus a truly random noise source. Since the quantum noise which is usually used in an optical medium is very small in the RF world, an internal noise source is used in lieu of the quantum noise present when using optical signals. The AE-RF interface can also decrypt a wireless signal from the wireless port adapter 172 (access point). We also note that optical and RF wireless systems can be connected to form robust free-space links (such as disclosed in U.S. Pat. No. 7,110,679 by Willebrand et al.) which is one application of our optical and RF wireless AlphaEta systems.

An AlphaEta encrypted RF wireless interface is particularly useful for secure mobile communications. To adapt AlphEta to this medium one needs a suitable local noise source to replace the usual quantum noise found in the optical domain. Truly random number generators based on a physical source of randomness can directly be used to create the noise, or if they are not of a suitable rate they can periodically re-seed a pseudo-random number generator such as AES in counter mode. Alternatively other noise sources such as amplified thermal noise from a high-gain amplifier. Note that in the case of a seeded pseudo-random number generator, the re-seeding process is internal to the transmitter and is never shared with any other parties, which is different from the secret key used in the AlphaEta extended key generator which must be shared between the transmitter and receiver via a key distribution scheme (Optical AlphaEta generation is described in more details in U.S. patent application Ser. No. 10/674,241 by the same inventive entity, which is incorporated herein by reference.) In any case, the noise can be added to the transmitted signal in the digital domain, causing a slight uncertainty in the M-ary output transmission state, or if it is an analog noise source it can be combined with the output of the digital-to-analog converter before being transmitted by the antenna.

One can create a fully wireless network or interface the RF wireless links to other links over different media to create mixed medium networks. For instance, an RF link can be part of a greater network that is also partially realized in optical fiber. One can use a format converter in order to connect the two different physical and (usually) protocol systems.

Figure 7:
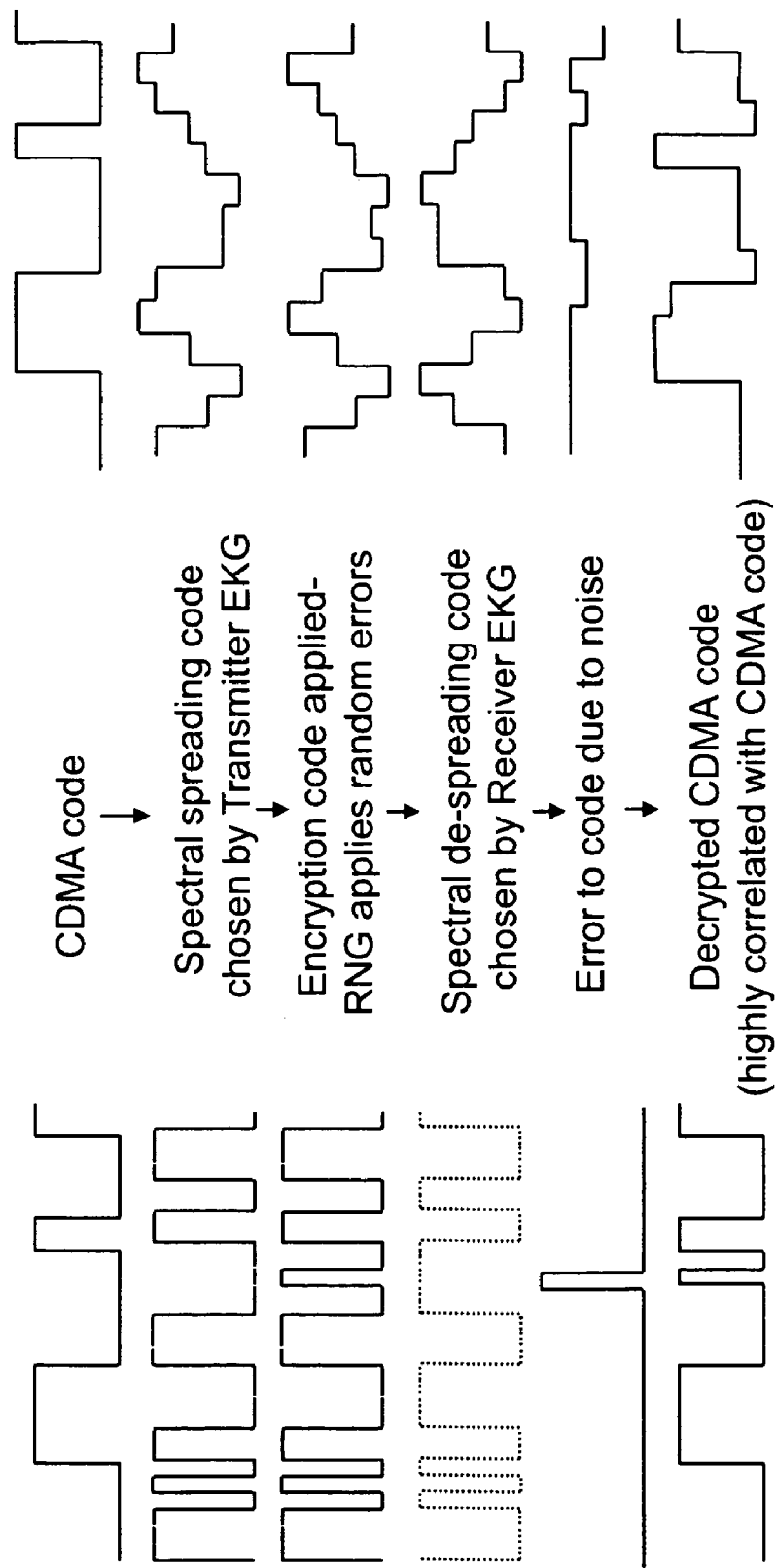
FIG. 7 shows a sequence of steps which can be applied to add noise to a CDMA signal. The traces on the left correspond to low probability/high error magnitude noise while the one on the right correspond to high probability/low error magnitude noise.

As one preferred embodiment of the invention, we will describe a wireless 802.11-(WiFi) like wireless local area network using AlphaEta style encryption. Our first embodiment will be of a network where all the nodes communicate via RF wireless using the same protocol. Such a system is depicted in FIG. 4 if one considers only stations 164 and 166 to be active. Later we will describe how the RF wireless format and the optical GbE formats can be melded together to realize a mixed-media mixed-format network. Extensions to other protocols and transmission formats are not to be considered excluded based on the description of this one particular implementation. To emphasize this point we note that the use of a spectral-spreading transmission format, instead of the orthogonal frequency division multiplexed (OFDM) format in this embodiment, is possible as well. FIG. 7 shows how an AlphaEta encryption signal can be overlaid onto a standard code-division multiple access (CDMA) signal.

Figure 8:
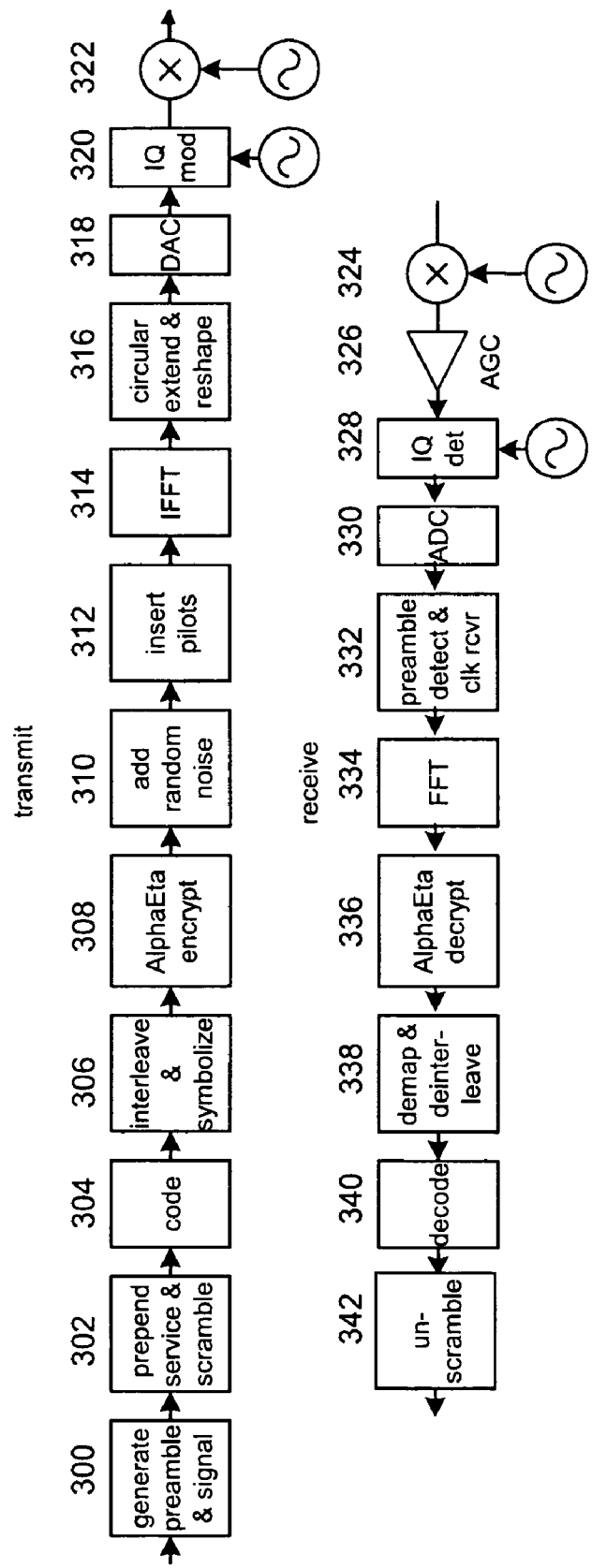
FIG. 8 Block diagram of AlphaEta implemented in a 802.11 (WiFi)-like wireless link.

A basic block diagram of an AE wireless protocol is shown in FIG. 8. We modified an 802.11 "Wi-Fi" type protocol as an exemplary embodiment. Most of the blocks in the system are common to an 802.11a/g implementation such as described in 802.11 Wireless Networks, M. S. Gast, O'Reilly Media Inc., 2002, including generating the preamble 300, prepend service and scramble 302, code 304, interleave and symbolize 306, insert pilots 312, inverse (fast) fourier transform IFFT 314, and circular extend and reshape 316. The signal is sent out via a DAC 318 through and I/Q modulator 320, to a mixer 322 and would subsequently be transmitted over the air via an antenna.

Figure 9:
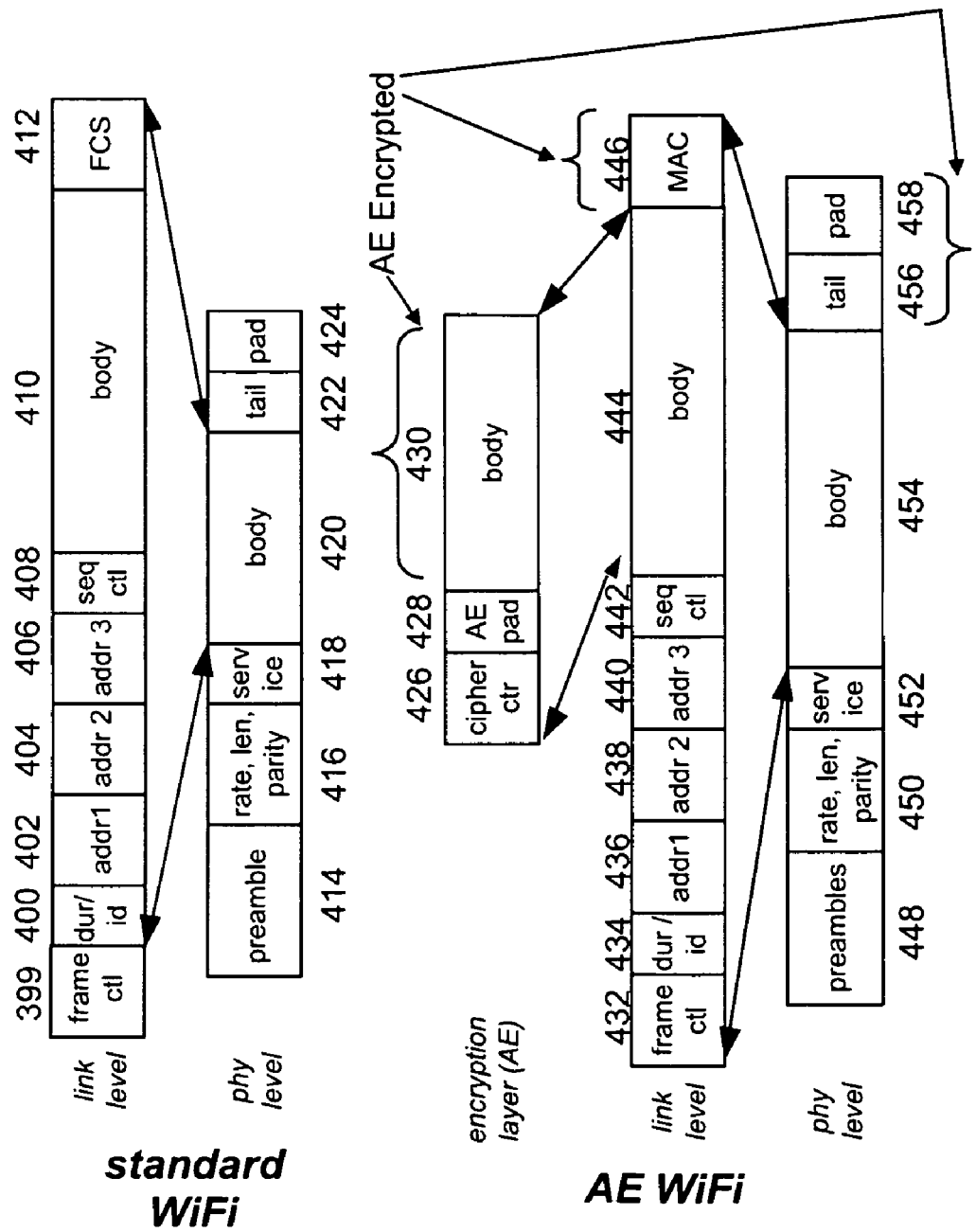
FIG. 9 is an example of how 802.11 frames can be converted from standard format to an RF-AlphaEta encrypted format.
Figure 10:
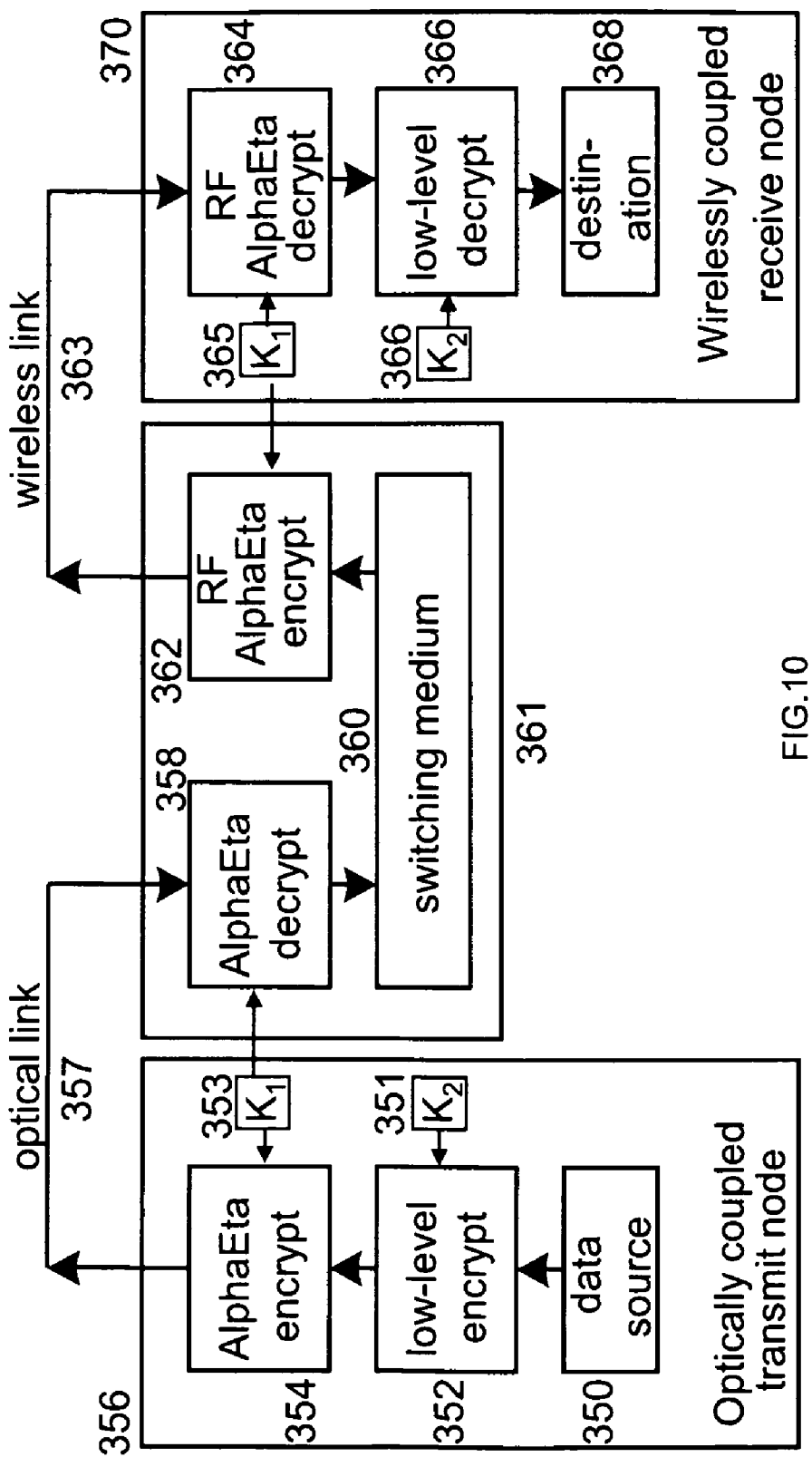
FIG. 10 is an example of using a hierarchy of keys to easily bridge between two different protocols such as GbE and 802.11. The AlphaEta M-ary key is stripped off before the switch to allow a standard switch to be used but the standard encryption remains protecting the data. The wireless link functions similar to a normal 802.11 link including the use of descrambling and error corrections since the typical processing such as error correction can be performed on the data if it is encrypted using a traditional encryption protocol.

The reverse operations are performed at the receiver including mixing 324, automatic gain control (AGC) 326 to control the size of the received signal, I/Q demodulation 328, an ADC 330, clock and preamble synchronization 332, fast Fourier transform 334, demap and deinterleaving 338, decoding 340, and descrambling 342. The new blocks in the chain are the AlphaEta encrypt and decrypt blocks 308, 336 signifying the encrypt and decrypt functions, and the noise generator adding random noise to the output 310 (at the transmitter only). Since the header and pilot tones are left in binary form standard synchronization procedures can be left in tact to enable frame and clock synchronization. As shown in FIG. 9 only a portion of the packet is sent in AlphaEta encrypted form. In this embodiment, AES in counter mode is used as the extended key generator of the AlphaEta encryption/decryption system and the counter value is included in the unencrypted packet header as shown in FIG. 9. Since the standard 802.11 synchronization procedure locates the position of the frame, encryption/decryption synchronization can be started at the appropriate time. Since the counter and key used are readily available from the information in the header (the key is not contained in the header but can be inferred from the address information if a key management system is in place), both the transmitter and receiver use the same counter and key values thereby having the same extended key as required.

FIG. 9 (top) shows the frame format of a typical 802.11 frame, including frame control 399, duration/identification information 400, the address information such as receiver, transmitter, and filtering 402, 404, 406, a sequence control filed 408, the body which contains the data 410, and a FCS 412 used for checking for errors. At the physical layer added functions include the preamble 414, rate/length/parity information 416, the service filed 418, the body 420 which contains the link layer 400-412, followed by a tail 422 and pad 424. These are all standard fields and their meaning is well known.

FIG. 9 (bottom) shows how this type of frame may be modified for AlphaEta encryption. Most fields are unchanged including the frame control 432, duration/identification 434, address information 436, 438, 440, and sequence control 442. A cipher counter 426 and AE pad 428 are added to the header information in unencrypted format. The cipher counter contains the counter value to be used in the counter-mode block cipher assumed to be used here. Note that the counter value should never be used twice with the same key as is the case with any such cipher. The "AE pad" (of all zeros) could be included so that the encrypted portion always starts at the beginning of the orthogonal frequency division multiplexed (OFDM) symbol which is the type of 802.11 transmission format we are assuming in this embodiment. Such a field would simplify the implementation, although it would not be necessary. Everything after the "AE Pad", including the body 430, optional message authentication code (MAC) 446 which could alternatively be simply a frame check sequence if MAC is performed at a higher level, tail 456, and pad 458. At the physical layer the preamble 448, rate/length/parity 450 and service fields 452 would remain unchanged. Note it is useful that the information typically used in the transmission format for determining the receive packet location, carrier frequency, etc. be left unchanged so as to cause as little interruption in the normal operation of the protocol as possible.

Let us assume for simplicity that the underlying wireless modulation format is binary phase shift keyed (BPSK). BPSK is one of several possible 802.11 constellation formats. Other formats, such as quadrature phase shift keyed, could also be used which would increase the maximum data rate under sufficient signal quality conditions. In the BPSK case, each of the multiple frequency bins involved in the OFDM modulated signal would thus be binary keyed in an unencrypted mode. The encrypted signal transmitted is then modified by the encryption process into an M-PSK signal. The extended key generator pseudo-randomly picks a particular phase rotation and this rotation is combined with locally generated noise (or a noise-seeded pseudo-random number generator) to determine the actual phase shift for each frequency bin. This noise replaces the quantum noise typically used in optical AlphaEta implementations. The phase shift is just a complex multiplication which could be performed, for example, by the inverse fast Fourier transform (IFFT) mechanism that is already present in conventional 802.11a transmitters.

Note that some frequency bins in 802.11 are not used to transmit data, but instead are pilot signals for aiding in maintaining synchronization such as the phase or frequency offset between the transmit and receive clocks. These signals could be left fully unencrypted in order to keep the synchronization protocols nearly identical as in the unencrypted case. Alternatively, the transmitter could encrypt these signals as well, and the receiver could decrypt them before using them as in a conventional receiver. Such a technique may make eavesdropping harder.

An access point (AP) is often used in a wireless network to relay information between stations. In our AlphaEta-capable wireless network the AP (or AE-RF port adapter) can be configured to either relay encrypted information between two separate stations (where the AP does not decrypt the data) or decrypt the data for itself as needed. As usual, the source/destination (and/or other) header information will be used to determine if a received packet is intended for a particular station and, if so, which key should be used for decryption. Additional bits in the header can be used to specify which type, if any, of encryption is being used allowing for AlphaEta encryption, traditional encryption, or unencrypted transmissions to be used as selected or negotiated by the users. Such a feature can be used in other parts of the network too, such as the optical GbE portion in a mixed network.

We note that there is interest in performing OFDM encoding in the optical domain as well, see for example, "Coherent optical OFDM: has its time come" by W. Sheih et al, Journal of Optical Networking, v.7, Is 3, Feb. 29, 2008. The modulation techniques described herein can also be applied to optical OFDM. Randomization (noise addition) via a random number generator may be circumvented by using an appropriately small optical signal which inherently contains its own quantum noise.

A network of optical links and wireless links using different communication protocols could also be realized, allowing the full network depicted in FIG. 4. One issue with such a system is that a wireless link is often much less reliable than a fiber link Strong error correction codes and the use of acknowledgement packets are used in the 802.11 protocol to address the reliability issue. In a typical local network using both wireless and wireline channels, the wireless format is terminated before sending the data on to the wireline channel. For instance, in a typical mixed 802.11/GbE network a signal which originates in the wireless domain is reformatted to GbE before sending on in the wireline domain. For instance a signal which originates in an 802.11 format from a wireless user will be pickup up by the appropriate access point and descrambled and error corrected. If the frame check sequence indicates that the frame is good, an acknowledgement packet is sent from the access point back to the original transmitter so that the transmitter knows that the frame has been received. The signal is then sent over the wireline in a GbE format (without the 802.11 overhead). In order for the access point to perform these functions, it must be able to read the digital data. The data itself could be encrypted in a binary format, but it is much more difficult to perform any frame checks or error correction if the data is encrypted in AlphaEta format.

To resolve this issue a hierarchy of keys can be used such that the data at the access point can be partially decrypted into a standard encrypted format which allows for digital processing such as error correction and descrambling. Acknowledgement packets can then be sent as in a standard system.

In order to implement such a hierarchy of keys one can separate the binary and M-ary encryption keys. One method to do this is shown in FIG. 9. A pseudo-random number generator (PRBS) contained inside the AlphaEta encryption block 354 is used for the AlphaEta encryption and is seeded with a secret key $K_1$ 353 and generates M−1 bits per encrypted symbol which are used to determine the random phase shift (between 0 to π). A second PRBS inside the low-level encrypt block 352 adds an additional bit of encryption effectively replacing the most-significant bit normally applied by the AlphaEta encryption. This encryption function is based off a different secret key $K_2$ 351. If desired, a multiplexer or other switching scheme can be added into the system such that either full M-ary AlphaEta encryption can be performed with $K_1$ or the (M−1)-ary encryption is performed as described above. In such a case one has an option of either using two separate (a hierarchy of) keys or, in cases where it is permitable, just one single key. Key $K_2$ is a secret key which is to be shared by the endpoints (legitimate receiver and transmitter) or other entities that need access to the full decrypted data. $K_2$ is also shared by the endpoints but can be shared with the access points 362, 364 or, in the case of FIG. 9, the switching medium 360, as well. In so doing, the switching medium or RF access point can convert the received AlphaEta encrypted signal into a signal which is encrypted with a standard digital encryption method. If it is an access point, it can then perform all the wireless protocol termination functions such as checking and correcting for errors, and then re-encrypt using key $K_1$ back into the AlphaEta M-ary format if desired. For instance, the RF AE receiver 364 can send a standard acknowledge frame back to the RF AE transmitter 362 after it has verified the frame was correctly received via the use of the FCS. Thus the needed processing can take place without allowing the access point the ability to fully decrypt the signal. However, an eavesdropper listening to the RF transmission will see the M-ary AlphaEta protocol. In many cases the access point and users are part of a private local area network and the key $K_1$ may be shared by all users, or if that is not considered secure maybe just all wireless users in a single local area. If the intermediary node is a switching node, then a standard switch can be used without requiring excess bandwidth or sophisticated packet processing to convert the M-ary encrypted signal into binary and vice-versa.

Although the two extended key generators described above could use any type of conventional encryption algorithm, a preferred implementation would be to use the same counter-mode cipher used for both, so as to be able to take advantage of any common required implementation resources. Additionally, the same counter can be used for both. In a wireless link a FCS can be computed across the headers and the data encrypted using the $K_2$ key and then appended. This frame could then be scrambled, coded, punctured, interleaved, and symbolized according to the conventional wireless protocol, and then the subcarrier symbols would be transformed to an M-ary constellation (where M is large) according to the extended key generator seeded with key $K_1$. When the "Wireless Port Adaptor" (or the "Access Point") receives a frame, it uses the cleartext "cipher counter" and its $K_1$ key to partically decrypt the signal. The data is now traditionally encrypted. Then it de-symbolizes, de-interleaves, decodes and descrambles the data according to the conventional wireless protocol. Although it cannot decrypt the data, it can verify the FCS of the encrypted data, and properly acknowledge errorless frames. The data can then be re-encrypted according to the AlphaEta protocol using key $K_1$ if desired.

We note that the use of two encryption keys, one for traditional encryption and one for the M-ary AlphaEta encryption (reduced to a π phase range) can be used for any system, even one which has only one communication format and where the intermediary nodes do not need to perform functions like descrambling or error correction. The benefit in that case is that partial decryption can reduce the bandwidth of the switches and obviate the need for extending the packet length in order to accommodate M-ary signals in a binary format. This will reduce cost and increase compatibility. However, the drawback is that the data is only traditionally encrypted at the switching nodes (not AlphaEta encrypted), which may be considered to be less secure. Fiber networks often span a very large geographical range and it is less likely that every node will be suitably secure. However for certain networks such a method may be preferred.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description.

What is claimed is:

1. A system for data transmission using a quantum encrypted signal, comprising:
    an optical transmitter transmitting the quantum encrypted signal; the signal is phase modulated according to an M-ary phase modulated format where the phase applied is determined by both a pseudo-random cryptographic algorithm working as a first extended key generator and the data to be transmitted;
    a number of data bits transmitted per symbol is N, wherein N<M;
    a receiver which measures an incoming transmitted signal by making measurements at two or more different phase quadratures, digitizes the measurement using analog-to-digital converters, and estimates the phase applied at the transmitter using a digital signal processor (DSP).

2. The system of claim 1, wherein the receiver is a polarization insensitive optical receiver, comprising:
    a circulator for receiving the incoming quantum encrypted signal and forwarding it to a 90 degrees hybrid coupler;
    the 90 degrees hybrid coupler splitting the signal into two arms labeled as a first in-phase (I) and a first quadrature phase (Q) signals;
    the first Q signal is delayed with respect to the first I signal by an integer number of one-half bit periods in a delay line;
    a first and a second Faraday mirrors reflecting the first I and delayed Q signals back to the 90 degree hybrid coupler; the delayed Q signal is additionally delayed with respect to the I signal in the delay line;
    the 90 degree hybrid coupler outputting a second I and a second Q signals; the second I passing the circulator;
    a first and a second photodetectors detecting the second I and the second Q signals and outputting a first and a second electrical signals being digitized using the analog-to-digital converter;
    the digital signal processor (DSP) processes the first and the second digital signals from the converter and determines a differential phase shift of the quantum encrypted signal; the differential phase shift being indicative of the encoded data.

3. The system of claim 1, wherein
the quantum encrypted signal is AlphaEta signal;
the receiver further comprising
a second extended key generator to decrypt the encoded data from the applied phase shift; the second extended key generator being complimentary to the first extended key generator located at the transmitter that is used to create the quantum encrypted signal.

4. The system of claim 1, wherein the quantum encrypted signal is a pulsed signal and wherein a portion of the incoming signal is separately detected to recover a clock.

5. The system of claim 4, wherein the clock is generated by feeding the incoming signal whose frequency is at the symbol rate into a linear feedback shift register to generate a non-return-to-zero signal which is subsequently transformed into a clock by a clock-and-data recovery circuit.

6. The system of claim 1, further comprising a signal regenerator after the DSP; the regenerator regenerating the encrypted signal and a re-transmitter retransmitting a regenerated encrypted signal.

7. The system of claim 6, wherein the re-transmitting is over an arbitrary medium.

8. The system of claim 6, wherein the re-transmitting is in radio frequency (RF) range.

9. The system of claim 1, wherein the transmitted symbol rate is variable and the receiver uses an asymmetric I/Q demodulator with a tunable delay line in order to recover the I/Q information from the signals with different symbol rate.

10. The system of claim 1, wherein the transmitter and the receiver are moving with respect to each other; a corresponding Doppler shift introduces a fast equivalent wavelength shift of the quantum encrypted signal; and the effect of the wavelength shift on the determination of the differential phase is accounted for via the digital signal processing.

11. A system for multiple-channel signal transmission, comprising:
    a plurality of optical differential phase-modulated signal transmitters of different wavelengths; wherein each channel's phase modulation can be either traditional or quantum encrypted,
    a receiver having a single asymmetric I/Q demodulator for detecting the differential phase of the signals; wherein an in-phase I and a quadrature Q outputs are followed by a wavelength division multiplexer to separate each channels I and Q signals;
    a series of photodetectors measuring each I/Q signal followed by analog-to-digital converters digitizing the signal,
    a DSP unambiguously determining the differential phase and subsequently the data applied to each channel.

12. The system of claim 11, wherein the channels can have a plurality of symbol rates; and a different asymmetric I/Q demodulator is used for each symbol rate;
    wherein an asymmetric delay of the I/Q demodulator is chosen to demodulate the desired symbol rate.

13. The system of claim 11, wherein the channel signals are with different symbol rates; the channels are separated out at the receiver prior to the I and Q signal detection by a wavelength selective filter.

14. The system of claim 11, wherein the transmitted symbol rate is variable and the receiver uses an asymmetric I/Q demodulator with a tunable delay line in order to recover the I/Q information from the channel signals with different symbol rate.

15. A system for data transmitting using an encrypted signal, comprising:
    a transmitter transmitting the encrypted signal wherein the encrypted signal has an M-ary format and the data is an N-ary format with N<M, the M-ary symbol is chosen based on the output of a pseudo-random cryptographic algorithm working as an extended key generator and the data to be transmitted;

at least a first node which receives, measures and retransmits the received encrypted signal; and a receiver which measures the incoming encrypted signal and decrypts it using a cryptographic algorithm.

16. The system of claim 15, further comprising the encrypted signal having an unencrypted header or a header traditionally encrypted with information allowing the first node to determine a source and a destination of a signal packet.

17. The system of claim 16, wherein the node switching an AlphaEta frame by converting an M-ary portion of the packet to a longer binary packet and then switching it using conventional switching technology and subsequently re-converting it into AlphaEta frames before retransmission.

18. The system of claim 16, wherein the frame header being modified by the node according to an underlying protocol without disturbing an AlphaEta encrypted portion of the packet.

19. The system of claim 15, wherein the node retransmits the signal without inspecting a header or modifying any portion of a packet.

20. The system of claim 15, wherein the first node switches AlphaEta frames by converting an M-ary portion of the packet to a longer binary packet which is subsequently switched into a traditional network being compatible with binary frames but not with M-ary AlphaEta frames, a resulting binary packet is transferred through the traditional network until it reaches a second node being compatible with M-ary AlphaEta frames, the second node re-converts the encrypted signal back to the M-ary AlphaEta format for sending through an AlphaEta-capable network.

21. The system of claim 15, wherein the first node switches AlphaEta frames by converting an M-ary portion of the packet to a longer binary packet which is subsequently switched into a traditional network being compatible with binary frames but not with M-ary AlphaEta frames, a resulting binary packet is transferred through the traditional network until it reaches the receiver which subsequently decrypts the binary packet into an unencrypted message.

22. The system of claim 15, wherein the encrypted data frames use an AlphaEta protocol over a network that is capable of sending the frames through the node using a key hierarchy where two or more keys are used to encrypt the data, one being an AlphaEta key, which can transform symbols from binary to M'ary format, another being a standard encryption key which is only distributed to nodes that are authorized to access a secret data itself, where the first node converts the M-ary AlphaEta signal into a binary traditionally encrypted signal for the purpose of processing the frames but then re-encrypts the frames into AlphaEta format upon re-transmission, and wherein the receiver decrypts both the AlphaEta and standard encryption in order to gain access to the secret data.

23. The system of claim 22, wherein encrypted data frames use the AlphaEta protocol over a network that is capable of sending the frames through the node using a key hierarchy where various keys are used to encrypt the data, at least one being an AlphaEta key which is shared with a next node required to process the frame and one standard key which is only shared with parties that are authorized to have access to the secret message, whereas the next processing node can decrypt the AlphaEta frames into encrypted binary frames for processing and subsequently re-encrypts into the AlphaEta format using a key that it shares with the next node that must process the frame, whereas such a procedure is repeated until the receiver receives the frame, and where the receiver can use the standard key to access the secret data itself.

24. The system of claim 22, wherein the transmission or re-transmission of a packet is of a protocol that requires an acknowledgement frame and wherein the following node can send an acknowledgement frame back based on its own frame processing as well based on acknowledgement frames received from other nodes which process the binary frame.

25. A system of data transmission using an encrypted signal, wherein an AlphaEta-style encryption is implemented in a radio-frequency communications and a local noise source generates noise which is added to an M'ary transmission symbol, where the M'ary symbol is determined both from a pseudo-random cryptographic algorithm and the data to be transmitted, and wherein the M'ary symbol contains N bits of information on the data, and where N<M.

26. The system of claim 25, wherein the radio-frequency communications uses an orthogonal frequency division modulation format and a plurality of sub-carriers are transformed into the M'ary symbol by an encryption process.

27. The system of claim 26 wherein a pad of suitable length is inserted in the packet of the encrypted signal, the pad ensures that the M'ary encrypted signaling can start at the beginning of an orthogonal frequency division multiplexed symbol.

28. The system of claim 25, wherein the radio communications is implemented in a software defined radio.

29. A method for data transmission of quantum encrypted signals, comprising:

sending at least a first quantum encrypted signal; the signal is phase modulated according to an M-ary phase modulated format where the phase applied is determined by both a pseudo-random cryptographic algorithm working as a first extended key generator and the data to be transmitted; a number of data bits transmitted per symbol is $N_1$, wherein $N_1<M$;

receiving the first transmitted signal by a receiver having a delay line corresponding to the symbol duration, measuring two or more different phase quadratures, digitizing measured signals, and estimating the phase using a digital signal processing, and recovering information from the transmitted data.

30. The method of claim 29, wherein the encrypted signal uses AlphaEta encryption.

31. The method of claim 30, further comprising:

switching an AlphaEta frame at a node by converting the M-ary portion of the packet to a longer binary packet and then switching it using conventional switching technology; and subsequently re-converting it into AlphaEta frames before retransmission.

32. The method of claim 31, further comprising:

the first quantum encrypted signal being encrypted using a key hierarchy where two or more keys are used to encrypt the data, one being an AlphaEta key, which can transform symbols from binary to M'ary format, another being a standard encryption key which is only distributed to nodes that are authorized to access a secret data itself, and converts the M-ary AlphaEta signal into a binary traditionally encrypted signal in the nodes;

processing the frames; but then re-encrypting the frames into AlphaEta format upon re-transmission, and decrypting both the AlphaEta and standard encryption at the receiver in order to gain access to the secret data.

33. The method of claim 29, further comprising:
sending a second quantum encrypted signal; the second signal is phase modulated according to an M-ary phase modulated format where the phase applied is determined by both a pseudo-random cryptographic algorithm working as a first extended key generator and the data to be transmitted; a number of data bits transmitted per symbol is $N_2 \neq N_1$, wherein $N_2 < M$;
adjusting the delay line in the receiver for receiving the second transmitted signal;
measuring two or more different phase quadratures of the second signal,
digitizing measured signals, and
estimating the second phase using a digital signal processing, and recovering information from the transmitted data in the second signal.

34. A method of data transmission using an encrypted signal, comprising:
sending a radio-frequency signal using an AlphaEta-style encryption; the signal uses an orthogonal frequency division modulation format and a plurality of sub-carriers are transformed into an M'ary symbol by an encryption process;
generating a local noise signal and adding it to the M'ary transmission symbol, where the M'ary symbol is determined both from a pseudo-random cryptographic algorithm and the data to be transmitted, and wherein the M'ary symbol contains N bits of information on the data, and where N<M;
receiving the transmitted encrypted signal, decrypting the signal by transforming the plurality of sub-carriers from M'ary to N'ary using the output of a matched pseudo-random cryptographic algorithm, and recovering data.

* * * * *